(12) United States Patent
Lai et al.

(10) Patent No.: US 8,473,555 B2
(45) Date of Patent: Jun. 25, 2013

(54) MULTILINGUAL SUPPORT FOR AN IMPROVED MESSAGING SYSTEM

(75) Inventors: Qing Zhang Lai, Austin, TX (US); Ann Marie Grizzaffi Maynard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/464,365

(22) Filed: May 12, 2009

(65) Prior Publication Data

US 2010/0293230 A1  Nov. 18, 2010

(51) Int. Cl.
G06F 15/16 (2006.01)
(52) U.S. Cl.
USPC .......................... 709/206; 709/246
(58) Field of Classification Search
USPC .................................. 709/206, 246
See application file for complete search history.

(56) References Cited

U.S. PATENT DOCUMENTS

| | | | |
|---|---|---|---|
| 5,062,143 A | 10/1991 | Schmitt | |
| 6,141,642 A | 10/2000 | Oh | |
| 6,993,474 B2 * | 1/2006 | Curry et al. | 704/3 |
| 6,996,520 B2 * | 2/2006 | Levin | 704/10 |
| 7,321,850 B2 * | 1/2008 | Wakita | 704/10 |
| 7,716,037 B2 * | 5/2010 | Precoda et al. | 704/2 |
| 7,849,144 B2 * | 12/2010 | Prajapat et al. | 709/206 |
| 7,970,598 B1 * | 6/2011 | Flanagan et al. | 704/2 |
| 2003/0125927 A1 | 7/2003 | Seme | |
| 2004/0064322 A1 | 4/2004 | Georgiopoulos et al. | |
| 2006/0206309 A1 * | 9/2006 | Curry et al. | 704/8 |
| 2007/0041370 A1 | 2/2007 | Cleveland | |
| 2007/0150278 A1 * | 6/2007 | Bates et al. | 704/257 |
| 2007/0168450 A1 | 7/2007 | Prajapat et al. | |
| 2010/0106499 A1 * | 4/2010 | Lubowich et al. | 704/235 |
| 2010/0204981 A1 * | 8/2010 | Ribeiro et al. | 704/8 |

OTHER PUBLICATIONS

Lowensohn, "Google Talk gets translation services (via robots)", Webware, Dec. 19, 2007, pp. 1-2.

\* cited by examiner

*Primary Examiner* — Kristie Shingles
(74) *Attorney, Agent, or Firm* — Yee & Associates, P.C.; Eustus Nelson

(57) ABSTRACT

One or more illustrative embodiments provide a method, apparatus, and computer program product for managing a session of electronic communications. In one illustrative embodiment, a language is identified using a processor for an incoming electronic communication received from a sender computer in the session. It is determined whether the language differs from a desired display language. The incoming electronic communication is translated into the desired display language using a translation service to form a translated incoming electronic communication responsive to a determination that the language differs from the desired display language. The translated incoming electronic communication is displayed in the session on a display device.

20 Claims, 11 Drawing Sheets

MULTILINGUAL SUPPORT FOR AN IMPROVED MESSAGING SYSTEM

BACKGROUND

1. Field

The illustrative embodiments relate generally to an improved data processing system and more specifically to a method, apparatus and computer program product for an improved messaging system. Still more particularly, the illustrative embodiments provide a method, apparatus, and computer program product for managing electronic communications in an improved messaging system.

2. Description of the Related Art

A messaging system allows users to transmit and receive messages with other users of the messaging system in one or more sessions. A messaging system may be implemented on one or more data processing systems in hardware, software, or a combination of hardware and software. An example of how a messaging system may be implemented is through one or more messaging servers and one or more messaging clients. One example of such an implementation is a messaging server that receives messages sent by one messaging client and transmits the message to one or more other messaging clients. The messaging clients, which may be implemented in a Web browser or one or more executables in an operating system, may process interaction with the user and may send and receive communications to the messaging server. The messaging server that may receive the requests may be implemented using one or more executables in an operating system or a Web server. The content of the messages sent and received by the messaging clients and the messaging server may be, for example, in the form of text, audio, or video.

Messaging systems are commonly used in the world of business because messaging systems are often more convenient than e-mail and more cost-effective than telephone calls or postal mail, especially when the parties are located in different countries. For example, a multinational company may provide a messaging system to its employees to allow communication with other employees and clients across geographical borders without the costs of international telephone calls or the delays of postal mail by making sending and receiving messages over existing data connections at each site. A project team at a business may be composed of employees at company locations in any number of countries. The project team may meet or communicate in individual messaging sessions or group messaging sessions at any convenient time using text, audio, and/or video messages through the messaging system.

Communication among employees in different countries becomes more complicated when the employees do not speak and/or write the same language. An employee in the United States may wish to hold a textual message session with a customer in China, but the employee may only speak English and the client may only speak Chinese. The employee may receive a message in Chinese, enter the Chinese message into a Web-based machine translation service, and read the English translation. To send a message in response, the employee may enter an English message into the Web-based translation service, receive the Chinese translation, and enter the Chinese translation into the messaging client for transmission to the client.

SUMMARY

One or more illustrative embodiments provide a method, apparatus, and computer program product for managing a session of electronic communications. In one illustrative embodiment, a language is identified using a processor for an incoming electronic communication received from a sender computer in the session. It is determined whether the language differs from a desired display language. The incoming electronic communication is translated into the desired display language using a translation service to form a translated incoming electronic communication responsive to a determination that the language differs from the desired display language. The translated incoming electronic communication is displayed in the session on a display device.

DETAILED DESCRIPTION

Figure 1:
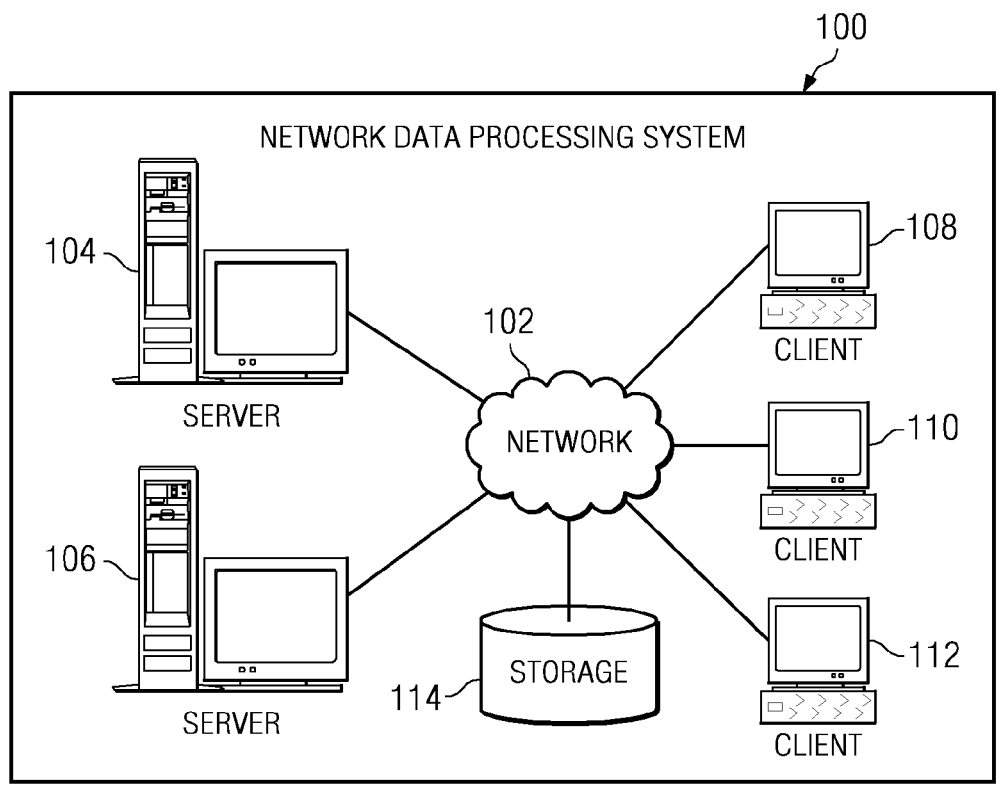
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As used herein, a "session" is a semi-permanent interactive information exchange, between two or more communicating devices. A session may be a chat between two or more users of a messaging system.

As used herein, the terms "translate" and "machine translate" are used interchangeably.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102. In addition, client computers 108, 110, and 112 connect to network 102. Storage unit 114 may also connect to network 102. Client computers 108, 110, and 112 may be, for example, personal computers or network computers. In the depicted example, server computer 104 provides data, such as boot files, operating system images, and applications to client computers 108, 110, and 112. Client computers 108, 110, and 112 are clients to server computer 104 in this example. Network data processing system 100 may include additional server computers, client computers, and other devices not shown. A messaging system may be implemented in network data processing system 100 using a messaging server executing on server computer 104, server computer 106, or both, and a messaging client executing on one or more of client computers 108, 110, and 112. Alternatively, server computer 104 and client computer 108 may instead be located within the same physical machine.

Program code located in network data processing system 100 may be stored on a computer recordable storage medium and downloaded to a data processing system or other device for use. For example, program code may be stored on a computer recordable storage medium on server computer 104 and downloaded to client computer 108 over network 102 for use on client computer 108.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

Figure 2:
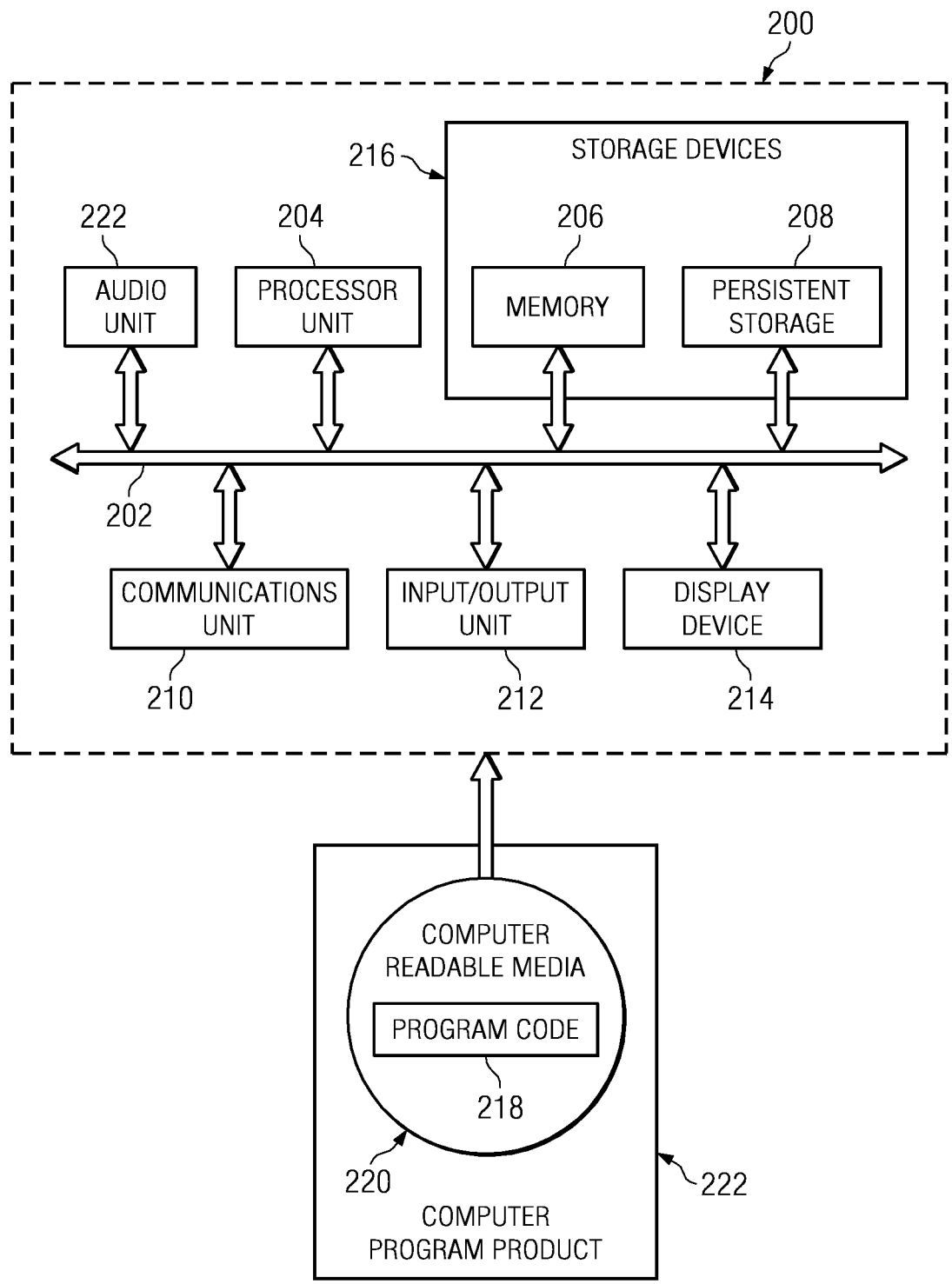
FIG. 2 is a diagram of a data processing system in which illustrative embodiments may be implemented.

With reference to FIG. 2, a diagram of a data processing system is depicted in accordance with an illustrative embodiment. Data processing system 200 is an example of a data processing system that may be used to implement computers in FIG. 1. For example, data processing system 200 may implement servers 104 and 106 and/or clients 108, 110, and 112. In this illustrative example, data processing system 200 includes communications fabric 202, which provides communications between processor unit 204, memory 206, persistent storage 208, communications unit 210, input/output (I/O) unit 212, and display device 214.

Processor unit 204 serves to execute instructions for software that may be loaded into memory 206. Processor unit 204 may be a set of one or more processors or may be a multi-processor core, depending on the particular implementation. Furthermore, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communication links.

Input/output unit 212 allows for input and output of data with other devices that may be connected to data processing system 200. For example, input/output unit 212 may provide a connection for user input through a keyboard, a mouse, and/or some other suitable input device. Display device 214 provides a mechanism to display information to a user.

Instructions for the operating system, applications and/or programs may be located in storage devices 216, which are in communication with processor unit 204 through communications fabric 202. Programs located in one or more of storage devices 216 and in communication with processor unit 204 through communications fabric 202 may be, for example, one or more messaging servers and messaging clients. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206. The computer implemented instructions may cause processing unit 204 to provide a messaging server, a messaging client, or both.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communication link and/or the connection may be physical or wireless in the illustrative examples. The computer readable media 220 also may take the form of non-tangible media, such as communication links or wireless transmissions containing the program code 218.

In some illustrative embodiments, program code 218 may be downloaded over a network to persistent storage 208 from another device or data processing system for use within data processing system 200. For instance, a program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code 218. As one example, the data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Furthermore, a memory may be, for example, memory 206 or a cache such as found in an interface and memory controller hub that may be present in communications fabric 202.

The different illustrative embodiments recognize and take into account a number of considerations. For example, the different illustrative embodiments recognize that when a user of a messaging system desires to communicate with others speaking languages not spoken and/or understood by the user, the user must enter the message into a Web-based translation service to read the translated message. Additionally, to send a message in the foreign language, the user may enter the native language message into the Web-based translation service before receiving a message in the foreign language.

The illustrative embodiments recognize that entering each foreign language message into a Web-based translation service has the following disadvantages: (1) additional time and effort is required from the user to enter each message into the Web-based translation service, simply to read and write messages with a user who speaks a different language; and (2) transferring messages manually or via copy and paste, for example, between the messaging client and the Web-based translation service is prone to errors. In view of these considerations and/or possibly other considerations, the different advantageous embodiments recognize that it would to advantageous to have a method, apparatus, and computer program product that takes into account one of more of the issues discussed above as well as possibly other issues.

Thus, the illustrative embodiments provide a method, apparatus, and computer program product for managing a session of electronic communications. In one illustrative embodiment, a language is identified using a processor for an incoming electronic communication received from a sender computer in the session. It is determined whether the language differs from a desired display language. The incoming electronic communication is translated into the desired display language using a translation service to form a translated incoming electronic communication responsive to a determination that the language differs from the desired display language. The translated incoming electronic communication is displayed in the session on a display device.

Figure 3:
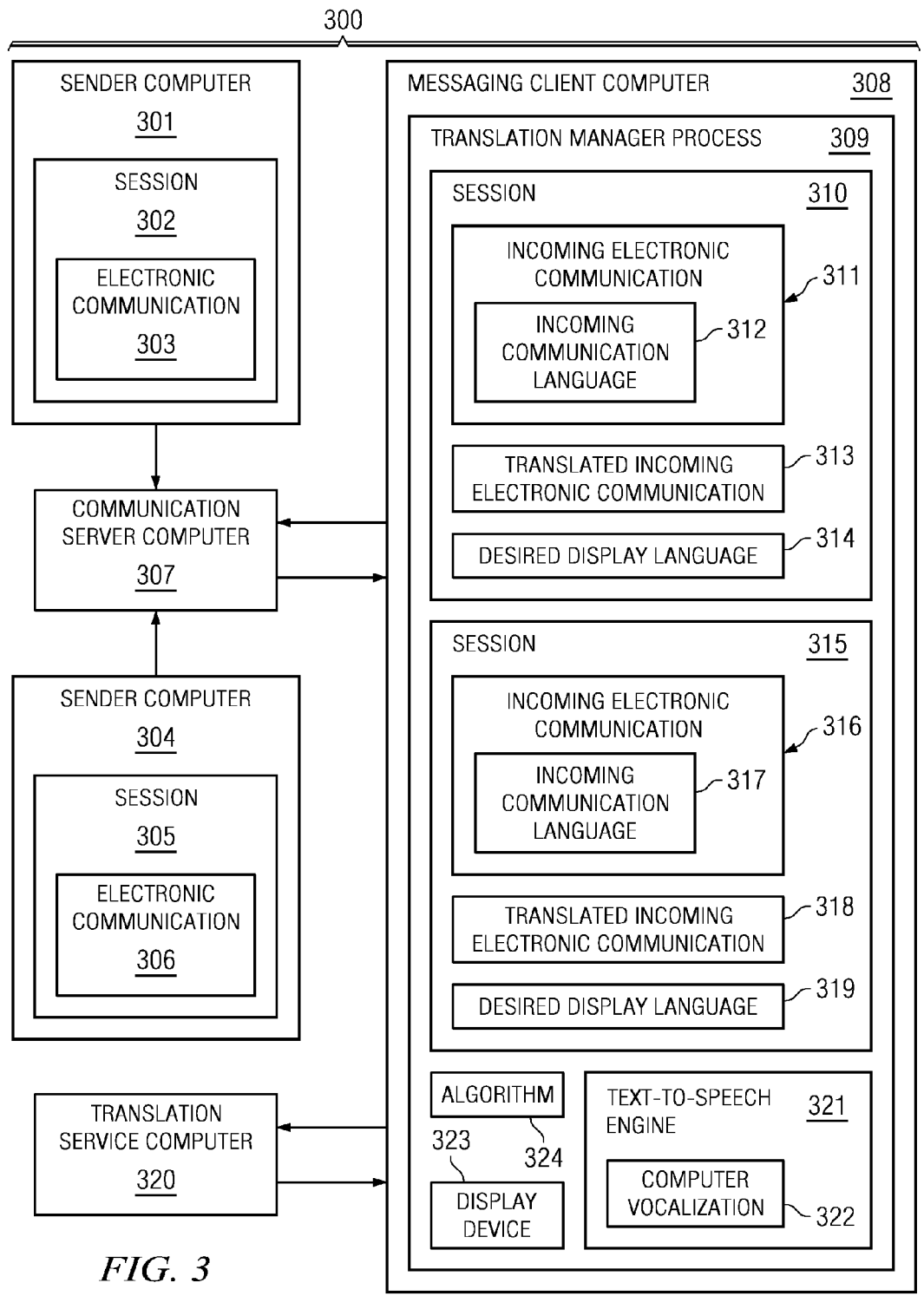
FIG. 3 is a block diagram of a messaging system in accordance with an illustrative embodiment in which a messaging client computer receives an incoming electronic communication transmitted by a sender computer.

With reference to FIG. 3, a block diagram of a messaging system in accordance with an illustrative embodiment is depicted in which a messaging client computer receives an incoming electronic communication transmitted by a sender computer. In illustrative examples, messaging system 300 may implement a number of illustrative embodiments that provide translation services for messages transmitted and/or received in messaging system 300. In one illustrative embodiment, network data processing system 100 implements messaging system 300.

In one or more illustrative embodiments, sender computer 301 sends electronic communication 303 to messaging client computer 308, and sender computer 304 sends electronic communication 306 to messaging client computer 308. Electronic communication 303 and electronic communication 306 may consist of text, audio, video, and/or some other suitable information.

As depicted, messaging system 300 includes communication server computer 307, sender computer 301, sender computer 304, and messaging client computer 308. Sender computer 301, sender computer 304, and messaging client computer 308 are illustrative as to the number of sender computers and messaging client computers, and should not be construed as an architectural limitation. Messaging client computer 308, sender computer 301 and sender computer 304 may implement data processing system 200. Messaging client computer 308, sender computer 301 and sender computer 304 may be implemented in one or more of client 108, client 110, and client 112. Communication server computer 307 may be implemented in one or more of server 104 and server 106.

Sender computer 301 may create session 302 and session 310 for the purpose of routing electronic communication 303 from sender computer 301 to messaging client computer 308 via communication server computer 307. As used herein, a "session" is a semi-permanent interactive information exchange between two or more communicating devices. A session may be a chat between two or more users of a messaging system, and may be created on one or more sender computers 301 and 304, and/or on one or more messaging client computers 308. A session may be represented, for example, by a window in a graphical user interface on one or more sender computers 301 and 304, and/or on one or more messaging client computers 308. One session may handle one or more electronic communications 303 to and/or from a sender, such as sender computers 301 and 304. Each session 310 and 315 may contain desired display languages 314 and 319, respectively. Desired display language 314 and 319 may be set by the user on a per-session basis and may be changed at any time.

In the example depicted in FIG. 3, sender computer 301 sends electronic communication 303 intended for messaging client computer 308 to communication server computer 307. Electronic communication 303 may contain an identification of the intended recipient of electronic communication 303 using, for example, a header, a tag, or an identifier. Upon receipt of electronic communication 303, communication server computer 307 identifies messaging client computer 308 as the intended recipient of electronic communication 303, and transmits electronic communication 303 to messaging client 308. Upon receipt of electronic communication 303 from communication server computer 307, messaging client computer 308 creates session 310 if session 310 does not already exist on messaging client computer 308. Session 310 may already exist on messaging client computer 308 if, for example, sender computer 301 has sent prior electronic communications 303 to messaging client computer 308.

Incoming electronic communications 311 and 316 may represent electronic communications 303 and 306, respectively, after incoming electronic communications 311 and 316 have been received by messaging client computer 308. In illustrative embodiments, translation manager process 309 analyzes incoming electronic communication 311 and automatically identifies incoming communication language 312. Translation manager process 309 may identify incoming communication language 312 using algorithm 324. Algorithm 324 may be, for example, one or more well known techniques, such as trigram language modeling. Trigram language modeling is an algorithm 324 for examining a body of text and identifying its language, and comparing successive trigrams into which the body of text is parsed with a library of sets of trigrams. Alternatively, incoming communication language 312 may be specified by the user. Incoming communication language 312 may be identified for each incoming electronic communication 311 processed by translation manager process 309.

Once incoming communication language 312 is identified, translation manager process 309 compares incoming communication language 312 to desired display language 314 for session 310. If incoming communication language 312 is the same as desired display language 314, translation manager process displays incoming electronic communication on display device 323. If incoming communication language 312 differs from desired display language 314, translation manager process 309 transmits incoming electronic communication 311, incoming communication language 312, and desired display language 314 to translation service computer 320. Translation manager process 309 may also request text-to-speech engine 321 that corresponds to desired display language 314. Translation manager process 309 may request incoming electronic communication 311 be translated by translation service computer 320 by using, for example, an application programming interface (API) call, remote procedure call (RPC), or a service-oriented architecture (SOA) request. Translation service 320 creates translated incoming electronic communication 313 by translating incoming electronic communication 311 into desired display language 314.

Once translation service computer 320 has created translated incoming electronic communication 313, translation service computer 320 transmits translated incoming electronic communication 313 to messaging client computer 308. Translation service computer 320 may also transmit text-to-speech engine 321 if requested by messaging client computer 308. Messaging client computer 308 delivers translated incoming electronic communication 313 to translation manager process 309. Translation manager process 309 displays translated incoming electronic communication 313 on display device 323. Translation manager process 309 may also create computer vocalization 322 by processing translated incoming electronic communication 313 using text-to-speech engine 321. Translation manager process 309 may cause messaging client computer 308 to audibly play computer vocalization 322 using audio unit 222.

In an illustrative embodiment, sender computer 304 sends electronic communication 306 intended for messaging client computer 308 to communication server computer 307. Electronic communication 306 may contain an identification of the intended recipient of electronic communication 306 using, for example, a header, a tag, or identifier. Upon receipt of electronic communication 306, communication server computer 307 identifies messaging client computer 308 as the intended recipient of electronic communication 306, and transmits electronic communication 306 to messaging client computer 308. Upon receipt of electronic communication 306 from communication server computer 307, messaging client computer 308 creates session 315 if session 315 does not already exist on messaging client computer 308. Session 315 may already exist on messaging client computer 308 if, for example, sender computer 304 has sent prior electronic communications 306 to messaging client computer 308 after messaging client computer has connected to communication server computer 307.

Incoming electronic communications 311 and 316 may represent electronic communications 303 and 306, respectively, after incoming electronic communications 311 and 316 have been received by messaging client computer 308. In illustrative embodiments, translation manager process 309 analyzes incoming electronic communication 316 and automatically identifies the incoming communication language 317. Translation manager process 309 may identify incoming communication language 317 using algorithm 324. Algorithm 324 may be, for example, one or more well known techniques such as trigram language modeling. Alternatively, incoming communication language 317 may be specified by the user.

Once incoming communication language 317 is identified, translation manager process 309 compares incoming communication language 317 to desired display language 319 for session 315. If incoming communication language 317 is the same as desired display language 319, translation manager process 309 displays incoming electronic communication 311 on display device 323. If incoming communication language 317 differs from desired display language 319, translation manager process 309 transmits incoming electronic communication 316, incoming communication language 317, and desired display language 319 to translation service computer 320. Translation manager process 309 may also request text-to-speech engine 321 that corresponds to desired display language 319. Translation manager process may request incoming electronic communication 316 be translated by translation service computer 320 using, for example, an application programming interface (API) call, remote procedure call (RPC), or a service-oriented architecture (SOA) request. Translation service 320 creates translated incoming electronic communication 318 by translating incoming electronic communication 316 into desired display language 319.

Once translation service computer 320 has created translated incoming electronic communication 318, translation service computer 320 transmits translated incoming electronic communication 318 to messaging client computer 308. Translation service computer 320 may also transmit text-to-speech engine 321 if requested by messaging client computer 308. Messaging client computer 308 receives incoming electronic communication 318 and/or text-to-speech engine 321, which delivers translated incoming electronic communication 318 to translation manager process 309. Translation manager process 309 displays translated incoming electronic communication 318 on display device 323. Translation manager process 309 may also create computer vocalization 322 by processing translated incoming electronic communication 318 using text-to-speech engine 321. Translation manager process 309 may cause messaging client computer 308 to play computer vocalization 322.

The illustration of messaging system 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, in some embodiments, sender computer 301 sends electronic communication 303 to messaging client computer 308 without relaying through communication server computer 307. In those embodiments, sender computer 301 uses communication server computer 307 to locate messaging client computer 308 on a network, such as network 102. In other embodiments, sender computer 301 includes incoming communication language 312 with electronic communication 303.

Figure 4:
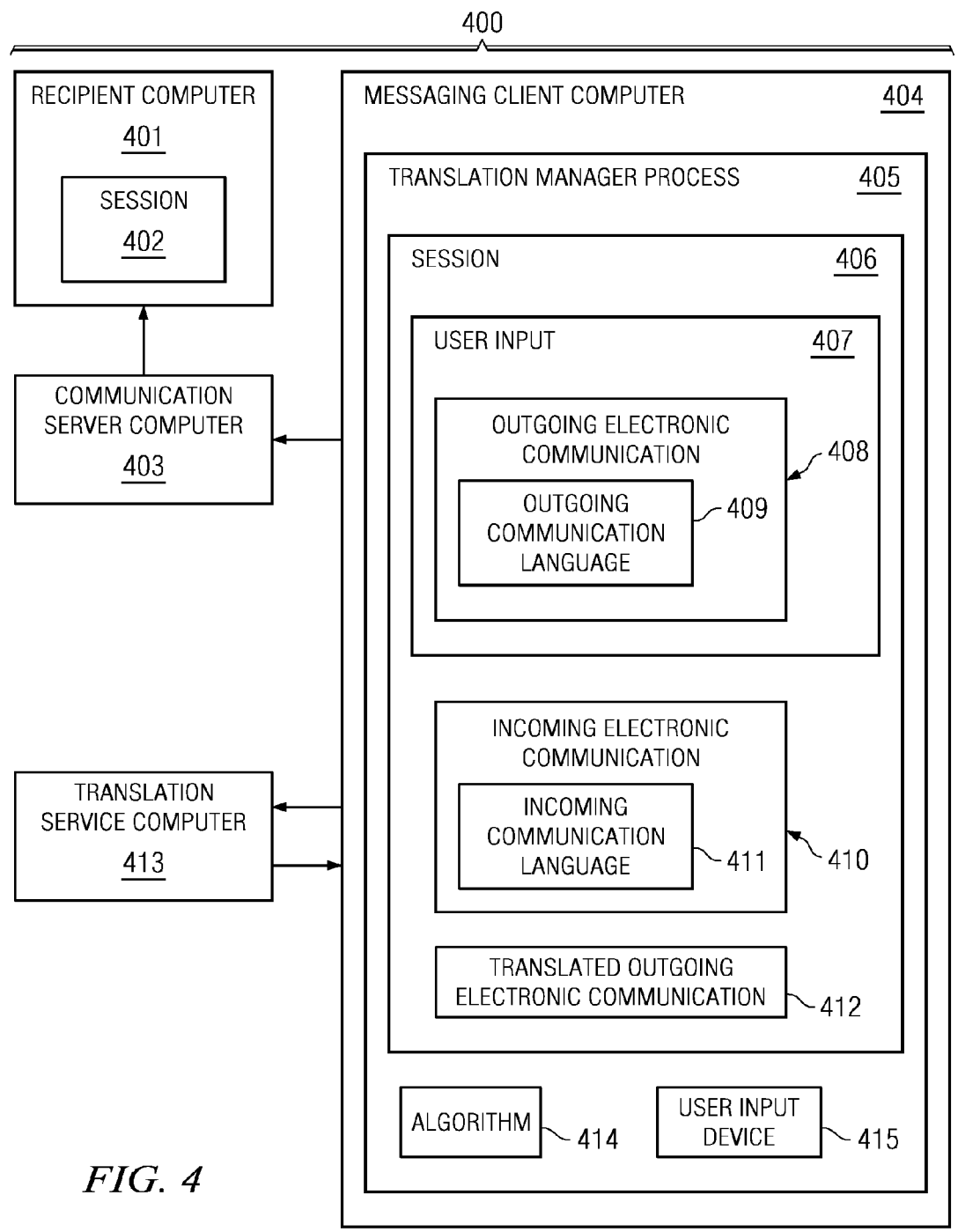
FIG. 4 is a block diagram of a messaging system in accordance with an illustrative embodiment in which a messaging client computer transmits an outgoing electronic communication to one or more recipient computers.

Turning now to FIG. 4, a block diagram of a messaging system in accordance with an illustrative embodiment is depicted in which a messaging client computer transmits an outgoing electronic communication to one or more recipient computers. In illustrative examples, messaging system 400 may implement a number of illustrative embodiments that provide translation services for messages transmitted and/or received in messaging system 400. In one illustrative embodiment, network data processing system 100 implements messaging system 400.

In one or more illustrative embodiments, messaging client computer 404 sends outgoing electronic communication 408 to recipient computer 401 via communication server computer 403. Outgoing electronic communication 408 and incoming electronic communication 410 may consist of text, audio, video, or any combination thereof.

As depicted, messaging system 400 includes communication server computer 403, messaging client computer 404, and recipient computer 401. Communication server computer 403, recipient computer 401, and messaging client computer 404 are illustrative as to the number of recipient computers and messaging client computers, and should not be construed as an architectural limitation. Communication server computer 403, messaging client computer 404 and recipient computer 401 may implement data processing system 200. Messaging client computer 404 and recipient computer 401 may be implemented in one or more of client 108, client 110, and client 112. Communication server computer 403 may be implemented in one or more of server 104 and server 106.

In an illustrative embodiment, messaging client computer 404 executes translation manager process 405. Translation manager process 405 accepts user input 407. User input 407 may be received from a user and/or user input device 415. User input 407 may be, for example, the contents and destination of outgoing electronic communication 408 and a user confirmation to send outgoing electronic communication 408. Messaging client computer 404 creates session 406, if session 406 does not already exist on messaging client computer 404. Session 406 may already exist on messaging client computer 404 if, for example, recipient computer 401 has sent prior electronic communications to messaging client computer 404 since messaging client computer 404 connected to communication server computer 403.

Translation manager process 405 analyzes outgoing electronic communication 408 and automatically identifies outgoing communication language 409. In these examples, outgoing communication language 409 is identified using algorithm 414. Algorithm 414 may be, for example, one or more well known techniques such as trigram language modeling. Alternatively, outgoing communication language 409 may be specified as desired display language 309 by the user. Translation manager process 405 then compares outgoing communication language 409 to incoming communication language 411. Incoming communication language may be identified from a prior incoming electronic communication 410 or set by the user. If outgoing communication language 409 is the same as incoming communication language 411, outgoing electronic communication 408 is sent to recipient computer 401. In these examples, outgoing electronic communication 408 is sent by relaying outgoing electronic communication 408 through communication server 403. If outgoing communication language 409 differs from incoming communication language 411, translation manager process causes messaging client computer 404 to transmit outgoing electronic communication 408, outgoing communication language 409, and incoming communication language 411 to translation service computer 413. Translation service computer 413 may be an implementation of translation service computer 320.

Translation service computer 413 performs machine translation on outgoing electronic communication 408 and returns translated outgoing electronic communication 412 to messaging client computer 404. Messaging client computer 404 transmits outgoing electronic communication 408 to communication server computer 403. Outgoing electronic communication 408 may contain header or other information indicating the intended recipient computer to communication server computer 403. Communication server computer 403 relays translated outgoing electronic communication 412 to recipient computer 401. Recipient computer 401 may initiate session 402 if session 402 does not already exist. Outgoing communication language 409 may be set by the user on a per-session basis and may be changed at any time.

The illustration of messaging system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, in some embodiments, messaging client computer 404 sends outgoing electronic communication 408 to recipient computer 401 without relaying through communication server computer 403. In those embodiments, messaging client computer 404 uses communication server computer 403 to locate recipient computer 401 on a network, such as network 102.

Figure 5:
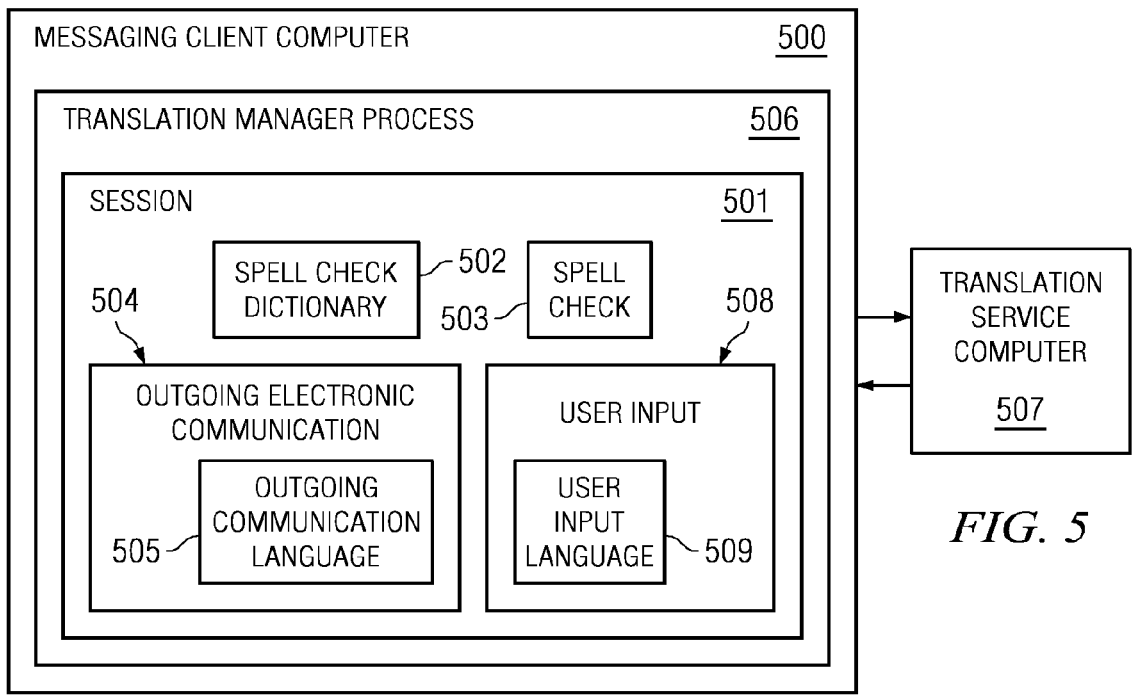
FIG. 5 is a block diagram of a messaging client computer that performs a spell check in accordance with an illustrative embodiment.

Turning now to FIG. 5, a block diagram of a messaging client computer that performs a spell check in accordance with an illustrative embodiment is depicted. Messaging client computer 500 may be messaging client computer 404. Session 501 may be session 406. Outgoing electronic communication 504 may be outgoing electronic communication 408, and outgoing communication language 505 may be outgoing communication language 409. User input 508 may be user input 407.

In illustrative embodiments, user input 508 is text entered by a user and/or a user input device, such as user input device 415. Translation manager process identifies user input language 509 based on the user input 508. For example, a user enters text into a graphical user interface, and translation manager process 506 identifies user input language 509 based on the text entered by the user. User input language 509 may be identified using an algorithm, such as algorithm 414. In some embodiments, algorithm 414 is trigram data modeling.

Translation manager process 506 stores spell check directory 502 corresponding to user input language 509 in session 501. Spell check directory 502 may be requested and retrieved from translation service computer 507. Translation manager process 506 performs spell check 503 on user input 508 using spell check directory 502. When translation manager process 506 receives a send command, translation manager process 506 uses user input 508 to create outgoing electronic communication 504. In some embodiments, translation manager process 506 also uses user input language 509 to form outgoing communication language 505. Spell check directory 502 is specific to session 501, and translation manager process 506 maintains spell check directory 502 on a per-session basis. A spell check directory 502 for the language corresponding to user input language 509 is retrieved each time translation manager process 506 detects a change to user input language 509.

For example, if the user changes user input language 509 from English to Spanish by inputting a different language in user input 508, translation manager process 506 retrieves a Spanish spell check dictionary 502 from translation service computer 507. Translation manager process 506 then performs spell check 503 on user input 508 in the corresponding user input language 509.

Figure 6:
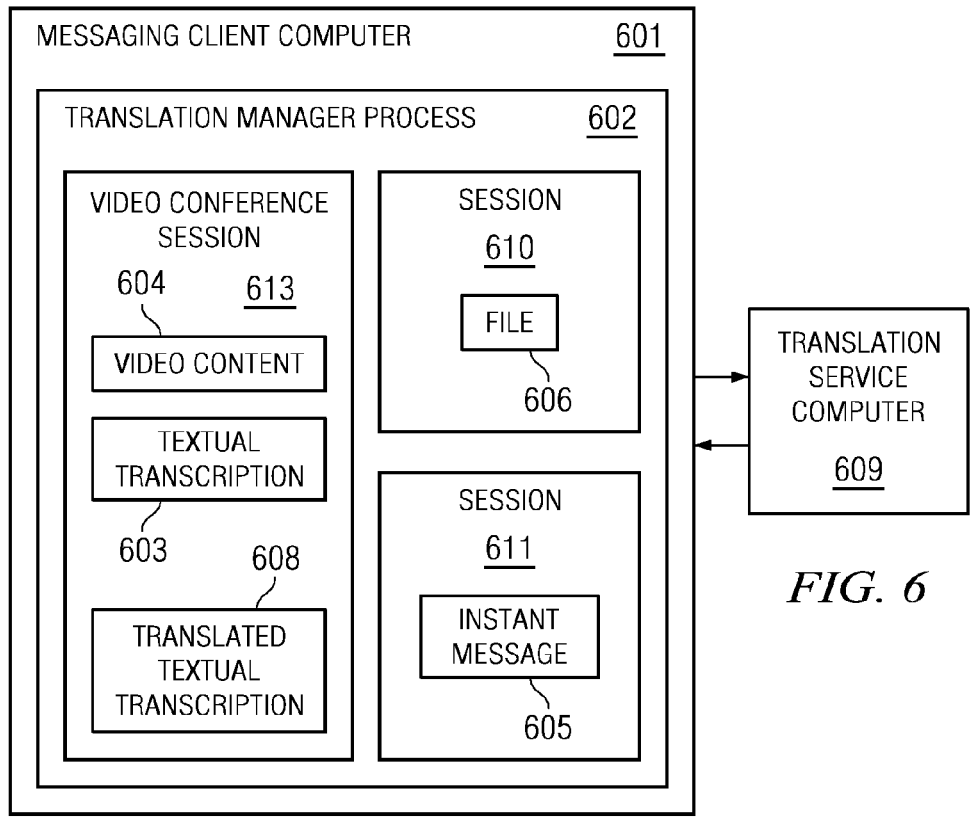
FIG. 6 is a block diagram of a messaging client computer in accordance with an illustrative embodiment in which a video conference session is conducted.

Turning now to FIG. 6, a block diagram of a messaging client computer in accordance with illustrative embodiments is depicted in which a video conference session is conducted. Messaging client computer 601 may be messaging client computer 308, messaging client computer 404, or messaging client computer 500. Translation manager process 602 may be translation manager process 309, translation manager process 405, or translation manager process 506. Video conference session 613 is an illustrative example of session 310, session 315, session 406, and session 501. In illustrative embodiments, messaging client computer 601 may establish video conference session 613 with one or more other computers, such as sender computer 301. Messaging client computer 601 may receive video content 604 and textual transcription 603. Textual transcription 603 may be incoming electronic communication 311. Video content 604 may be encoded and decoded using well-known video encoder and decoder (codec) processes, such as H.264. In the depicted example, textual transcription 603 is received by messaging client computer 601. Translation manager process 602 may request a translation from translation service computer 609, as disclosed in an illustrative embodiment described in connection with FIG. 3. Translation service computer 609 may return translated textual transcription 608 to messaging client computer 601. Translated textual transcription 608 may be an implementation of translated incoming electronic communication 313.

In another illustrative embodiment, session 610 may be session 310. File 606 may be an implementation of incoming electronic communication 311. In this illustrative embodiment, translation manager process 602 provides translation services for text-based files transferred to and from messaging client computer 601. In yet another illustrative embodiment, session 611 may be session 310, and instant message 605 may be incoming electronic communication 311.

The illustration of messaging client computer 601 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, in some embodiments, translation service computer 609 and messaging client computer 601 are implemented in the same machine, such as client 108. In other embodiments, video content 604 may not be included in videoconference session 612. In those embodiments, textual transcription is sent to messaging client computer 601, but video content 604 is delivered to another data processing system, such as data processing system 200.

Figure 7:
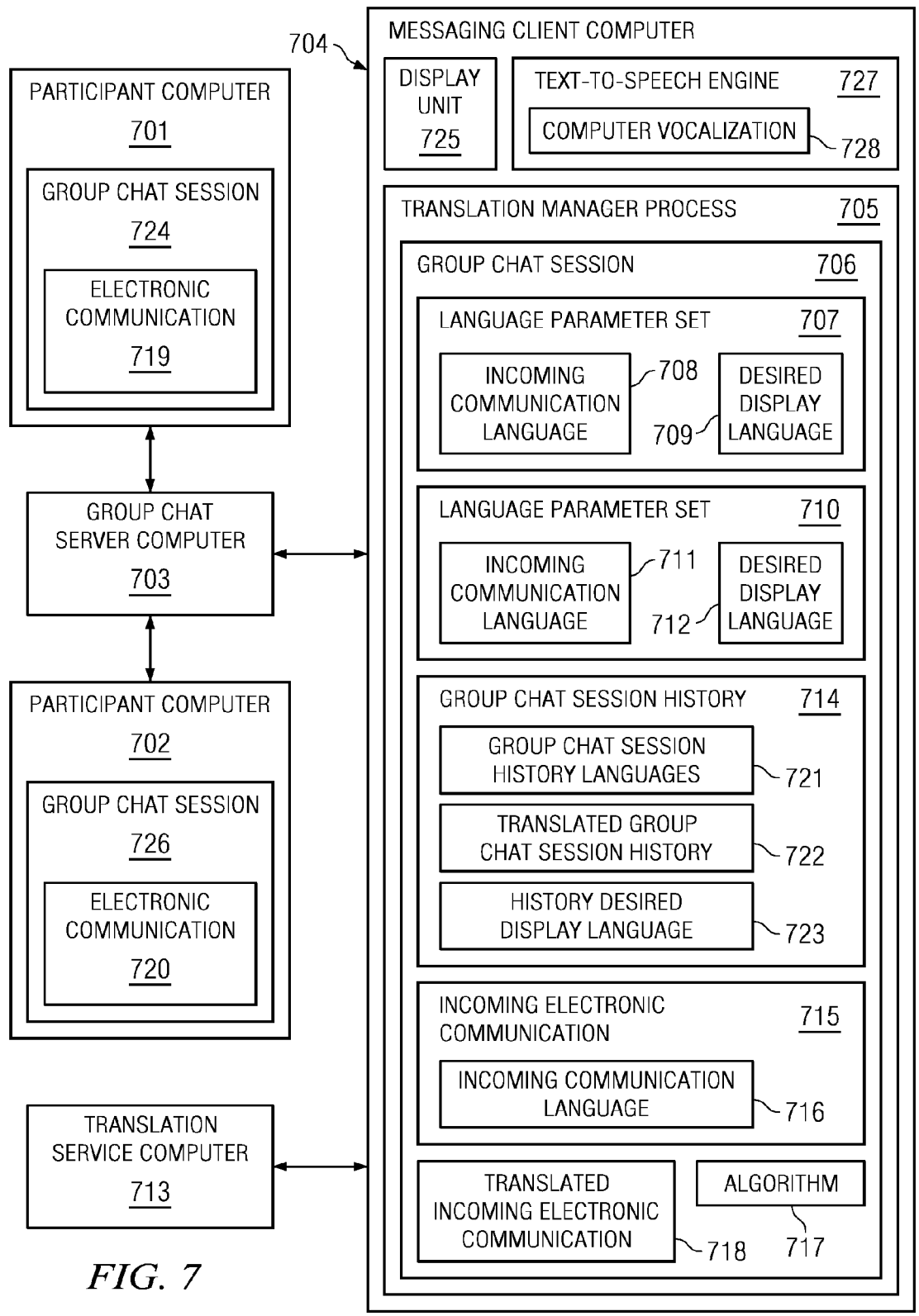
FIG. 7 is a block diagram of a messaging system in which a group chat is occurring in accordance with an illustrative embodiment.

Turning now to FIG. 7, a block diagram of a messaging system with group chat functionality in accordance with an illustrative embodiment is depicted. Messaging client computer 704 may be messaging client computer 308. Translation manager process 705 may be translation manager process 309. Group chat server computer 703 may be an illustrative example of communication server computer 307. The number of participant computers 701 and 702, and the number of group chat server computers 703, translation service computers 713, and messaging client computers 704 depicted are illustrative in nature and should not be construed as a limitation.

In illustrative embodiments, messaging client computer 704 receives an incoming electronic communication 715 from each of participant computers 701 and 702. Messaging client computer 704 and participant computers 701 and 702 may be connected to group chat server computer 703, for example, over a network. Messaging client computer 704 and participant computers 701 and 702 establish group chat sessions 706, 724, and 726. In some embodiments, a graphical user interface implements group chat sessions 706, 724, and 726. In such embodiments, electronic communications, such as electronic communications 719 and 720, translated incoming electronic communications, such as translated incoming electronic communication 718, and translated group chat session history, such as translated group chat session history 722 are displayed in the graphical user interface. Messaging client computer 704 may establish group chat session 706 responsive to receiving incoming electronic communication 715 from one or more participant computers 701 and 702 through group chat server computer 703. Group chat session 706 may also be established on messaging client computer 704 upon request by group chat server computer 703, for example, in response to an electronic communication 719 intended for messaging client computer 704. Once group chat session 706 is established, one or more electronic communications 719 and 720 are transmitted by participant computer 701 and/or participant computer 702 via group chat server computer 703.

In an illustrative embodiment, once group chat session 706 is established, group chat server computer 703 or one or more participant computers 701 and 702 transmit group chat session history 714 to messaging client computer 704. Messaging client computer 704 passes group chat session history 714 to translation manager process 705. Translation manager process 705 analyzes group chat session history 714 and determines one or more group chat session history languages 721. If group chat session history languages 721 match history desired display language 723, translation manager process 705 causes messaging client computer 704 to display group chat session history 714. History desired display language 723 may be a setting set by user input or automatically identified based on the default language settings of messaging client computer 704 or translation manager process 705. If group chat session history languages 721 differ from history desired display language 723, translation manager process 705 causes messaging client computer 704 to transmit entries in group chat session history 714 and group chat session history languages 721 to translation service computer 713. Translation service computer 713 translates group chat session history 714 into history desired display language 723 and transmits translated group chat session history 722 to messaging client computer 704. Translation manager process 705 then causes messaging client computer 704 to display translated group chat session history 722 using display unit 725.

In one illustrative embodiment, participant computer 701 transmits electronic communication 719 to group chat server computer 703. Electronic communication 719 may contain an identifier designating the chat session or participant computers for which it is intended. Group chat server computer 703 relays electronic communication 719 to other group chat participants, such as participant computer 702 and messaging client computer 704. Messaging client computer 704 receives electronic communication 719 from participant computer 701 as incoming electronic communication 715. Messaging client computer 704 passes incoming electronic communication 715 to translation manager process 705. Translation manager process 705 creates language parameter set 707 representing participant computer 701. Translation manager process 705 analyzes incoming electronic communication 715 and identifies incoming communication language 716. Translation manager process 705 identifies incoming communication language 708 using algorithm 717. Algorithm 717 may be, for example, one or more well known techniques, such as trigram language modeling. Trigram language modeling is an algorithm 717 for examining a body of text and identifying its language compares successive trigrams into which the body of text is parsed with a library of sets of trigrams. Alternatively, incoming communication language 708 may be specified by the user.

Translation manager process 705 associates language parameter set 707 with participant computer 701, the sender of incoming electronic communication 715. Translation manager process 705 then stores incoming communication language 708 and desired display language 709 in language parameter set 707. Desired display language 709 may be desired display language 314. Desired display language 709 may be determined based on user input, or may be automatically determined based on a default language setting of translation manager process 705 or messaging client computer 704. Desired display language 709 may be updated at any time. For example, desired display language 709 may be updated by the user after messaging client computer 704 receives a first incoming electronic communication 715, and prior to messaging client computer 704 receiving a second incoming electronic communication 715.

Once incoming communication language 708 is identified, translation manager process 705 compares incoming communication language 708 to desired display language 709 for language parameter set 707. If incoming communication language 708 is the same as desired display language 709, translation manager process displays incoming electronic communication 715 on display device 725. If incoming communication language 708 differs from desired display language 709, translation manager process 705 transmits incoming electronic communication 715, incoming communication language 708, and desired display language 709 to translation service computer 713.

Once translation service computer 713 has created translated incoming electronic communication 718, translation service computer 713 transmits translated incoming electronic communication 715 to messaging client computer 704, which delivers translated incoming electronic communication 718 to translation manager process 705. In some embodiments, translation manager process also requests text-to-speech engine 727 that corresponds to desired display language 709. Translation manager process 705 displays translated incoming electronic communication 718 on display device 725. In some embodiments, translation manager process 705 also creates computer vocalization 728 by processing translated incoming electronic communication 715 using text-to-speech engine 727. Translation manager process 705 may also process a user name or other identifier associated with participant computer 701 using text-to-speech engine 727 and add the result to computer vocalization 728. Translation manager process 705 then causes messaging client computer 704 to audibly play computer vocalization 728 using audio unit 222.

In some illustrative embodiments, participant computer 702 likewise sends electronic communication 720 to group chat server computer 703 for relay to participant computer 701 and messaging client computer 704. Translation manager process 705 creates a language parameter set 710 representing participant computer 702. Language parameter set 710 may contain incoming communication language 711 and desired display language 712 that differ from incoming communication language 708 and desired display language 709 stored in language parameter set 707 associated with participant computer 701.

In another illustrative embodiment, messaging client computer 704 transmits one or more messages to group chat server computer 703, which distributes the one or more messages to participant computers 701 and 702.

Figure 8:
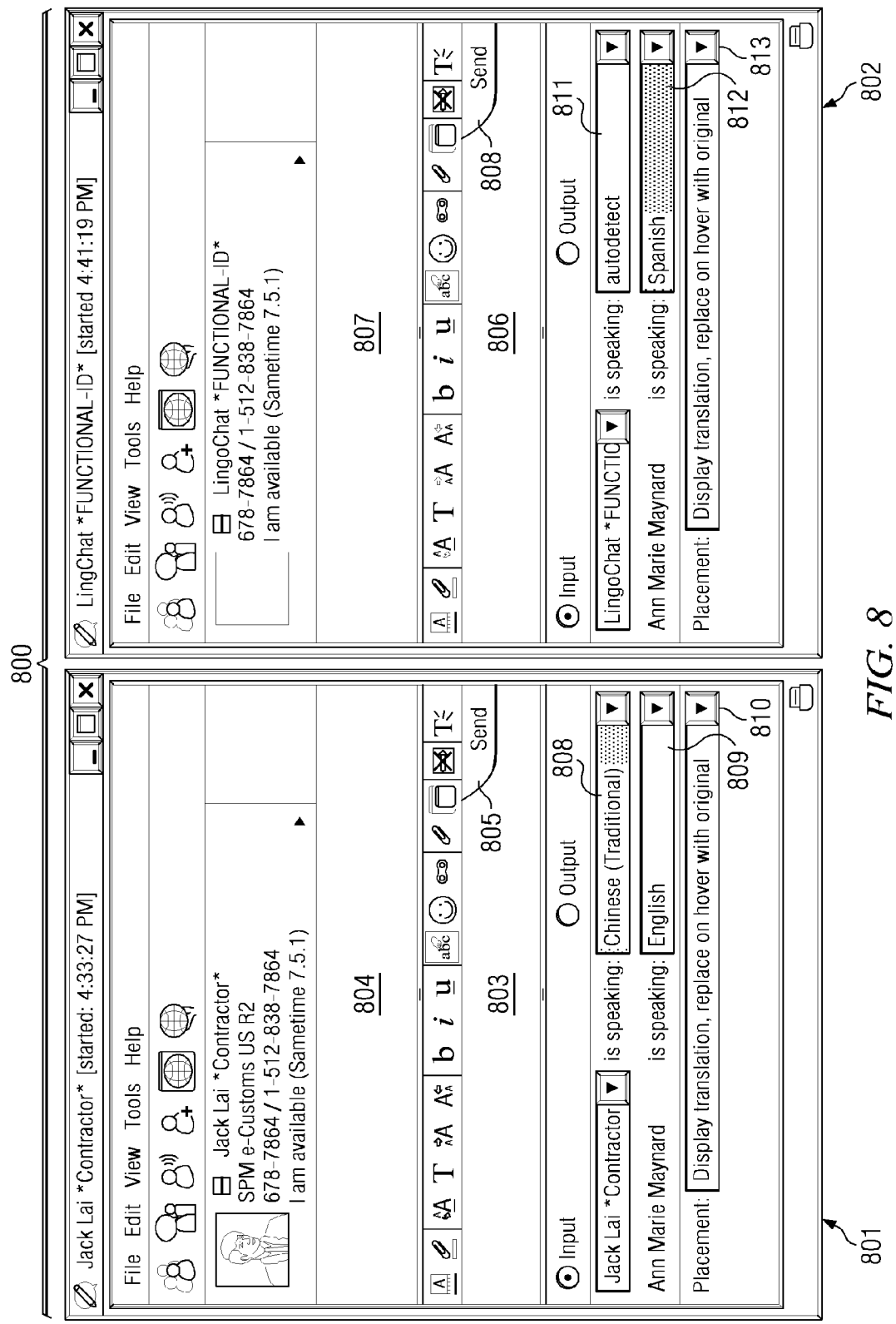
FIG. 8 is a screenshot of a graphical user interface displaying two sessions in accordance with an illustrative embodiment.

FIG. 8 depicts a screenshot of a graphical user interface displaying two sessions in accordance with an illustrative embodiment. In this example, the user is running two sessions 801 and 802 in graphical user interface 800. Graphical user interface 800 may be generated by translation manager process 309, and may be displayed by display device 323. For session 801, the user enters outgoing electronic communications in input field 803. The user may initiate the transmission of an outgoing electronic communication in input field 803 by clicking send button 805. Translated incoming electronic communications are displayed in text box 804.

The user sets the incoming communication language using dropdown field 808, and the desired display language using dropdown field 809. Based on the example of session 801, the user may enter English outgoing communications, which will be translated into Chinese prior to transmission. Likewise, Chinese incoming communications will be translated to English prior to display in text box 804. The user may also set display options in dropdown 810. In this example, the user has set the display options to display the translated content in text box 804, with the original text available by hovering the mouse over the translated text. When a user moves a computer mouse, the system commonly moves a mouse pointer in a graphical user interface, such as graphical user interface 800, in two dimensions corresponding to the movement of the computer mouse. Hovering the mouse is a process in which a user pauses movement of the mouse cursor over a defined area in a graphical user interface. Hovering the mouse commonly triggers an event in the graphical user interface, such as a pop-up of additional information about the item over which the pointer is hovering.

Likewise, for session 802, the user enters outgoing electronic communications in input field 806. The user may initiate the transmission of an outgoing electronic communication in input field 806 by clicking send button 811. Translated incoming electronic communications are displayed in text box 807. The user sets the incoming communication language using dropdown field 811, and the desired display language using dropdown field 812. Based on the example of session 802, the user has enabled the automatic detection of incoming communication language in dropdown field 811. Once the incoming communication language is determined based on incoming electronic communications, the user may enter Spanish outgoing communications, which will be translated into the incoming communication language prior to transmission. Likewise, incoming communications will be translated to Spanish prior to display in text box 807. The user may also set display options in dropdown 813. In this example, the user has set the display options to display the translated content in text box 807, with the original text available by hovering the mouse over the translated text.

Figure 9:
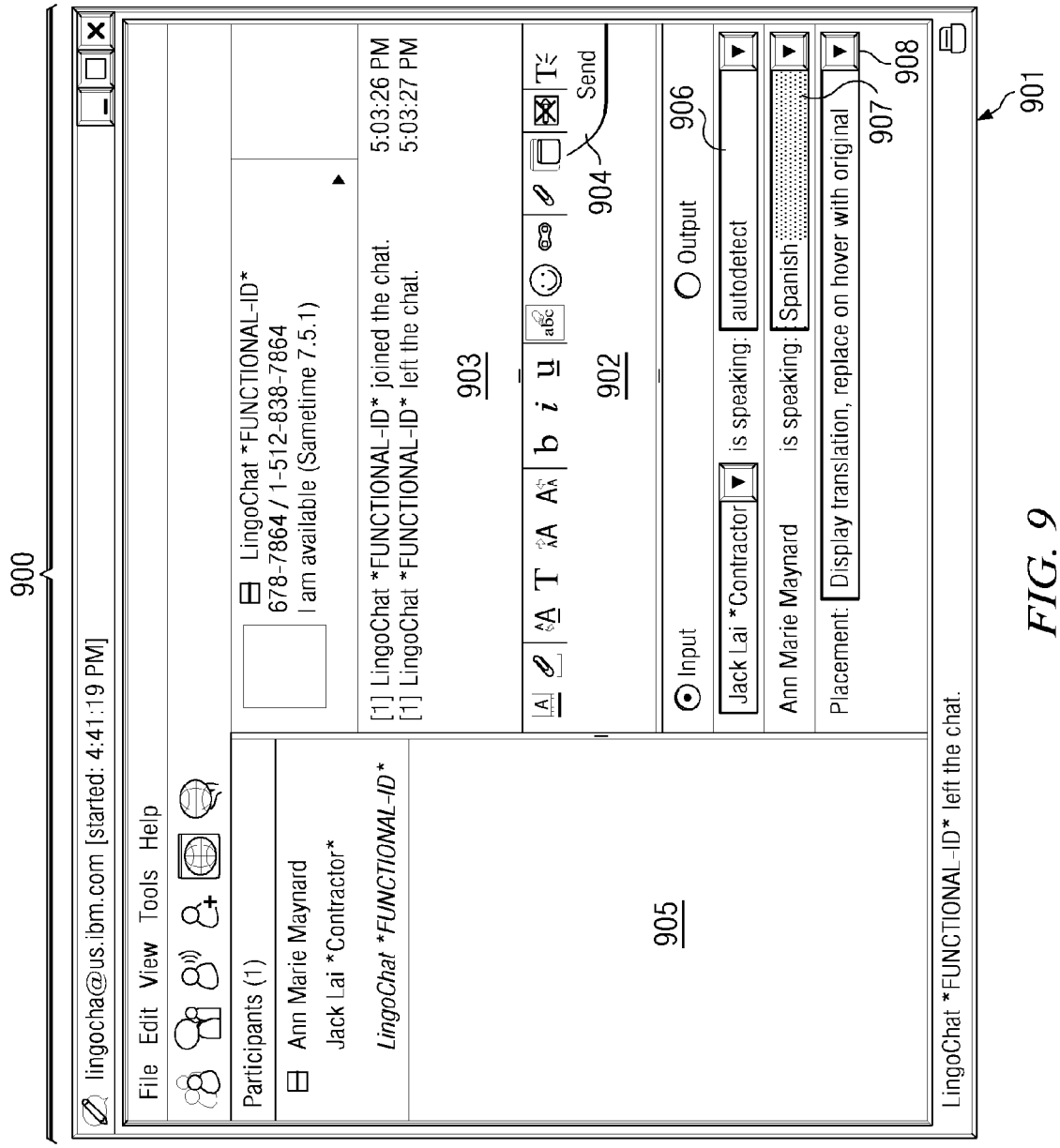
FIG. 9 is a screenshot of a graphical user interface displaying a group chat session in accordance with an illustrative embodiment.

FIG. 9 is a screenshot of a graphical user interface displaying a group chat session in accordance with an illustrative embodiment. Graphical user interface 900 may be generated by translation manager process 309, and may be displayed by display device 323. In this example, the user is running group chat session 901 in graphical user interface 900. Group chat session 901 may be an implementation of group chat session 706. Participants in group chat session 901 are displayed in list 905. The user may enter outgoing electronic communications in input field 902. The user may initiate the transmission of an outgoing electronic communication in input field 902 to all participants in list 905 by clicking send button 904. Translated incoming electronic communications from all participants in list 905 are displayed in text box 903. The user sets the incoming communication language using dropdown field 906, and the desired display language using dropdown field 907.

Given the selected options in this example, the user has enabled the automatic detection of incoming communication language in dropdown field 906. Once the incoming communication language is determined based on incoming electronic communications, the user may enter Spanish outgoing communications, which will be translated into the incoming communication language prior to transmission. Likewise, incoming communications will be translated to Spanish prior to display in text box 903. The user may also set display options in dropdown 908. In this example, the user has set the display options to display the translated content in text box 903, with the original text available by hovering the mouse over the translated text.

Figure 10:
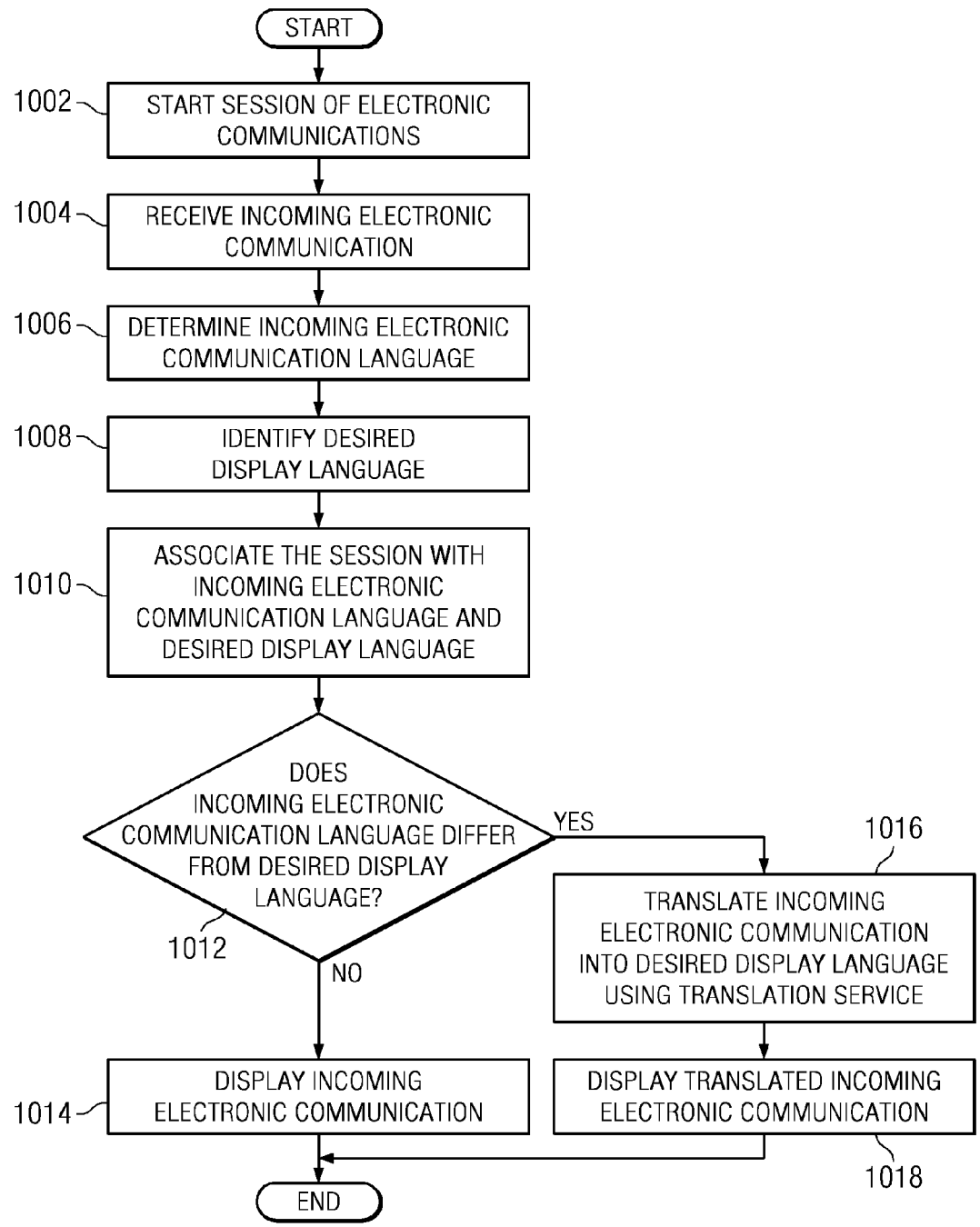
FIG. 10 is a flowchart of a process for translating an incoming electronic communication in accordance with an illustrative embodiment.

FIG. 10 depicts a flowchart of a process for translating an incoming electronic communication in accordance with an illustrative embodiment. The process may be implemented by translation manager process 309 running on messaging client computer 308. The process begins when the messaging client computer starts a session of electronic communications (1002). The messaging client computer receives the incoming electronic communication (1004). The messaging client computer then determines an incoming electronic communication language (1006). The determination may be made using well-known algorithms, such as the trigrams algorithm. The messaging client computer then identifies a desired display language (1008). The desired display language may be identified using, for example, user input or default settings of the system.

The messaging client computer then associates the session with the incoming electronic communication language and the desired display language (1010). The messaging client computer then determines whether the incoming electronic communication language differs from the desired display language (1012). If the incoming electronic communication language differs from the desired display language, the messaging client computer displays the incoming electronic communication (1014).

If the incoming electronic communication language differs from the desired display language at step 1012, the messaging client computer translates the incoming electronic communication into the desired display language using a translation service (1016). The messaging client computer may transmit the incoming electronic communication, the incoming electronic communication language, and the desired display language to a translation service computer. The translation service computer may be located in the same or a different physical data processing system as messaging client computer. The translation service computer may return a translated incoming electronic communication. Messaging client computer may then display the translated incoming electronic communication (1018). The process terminates thereafter.

Figure 11:
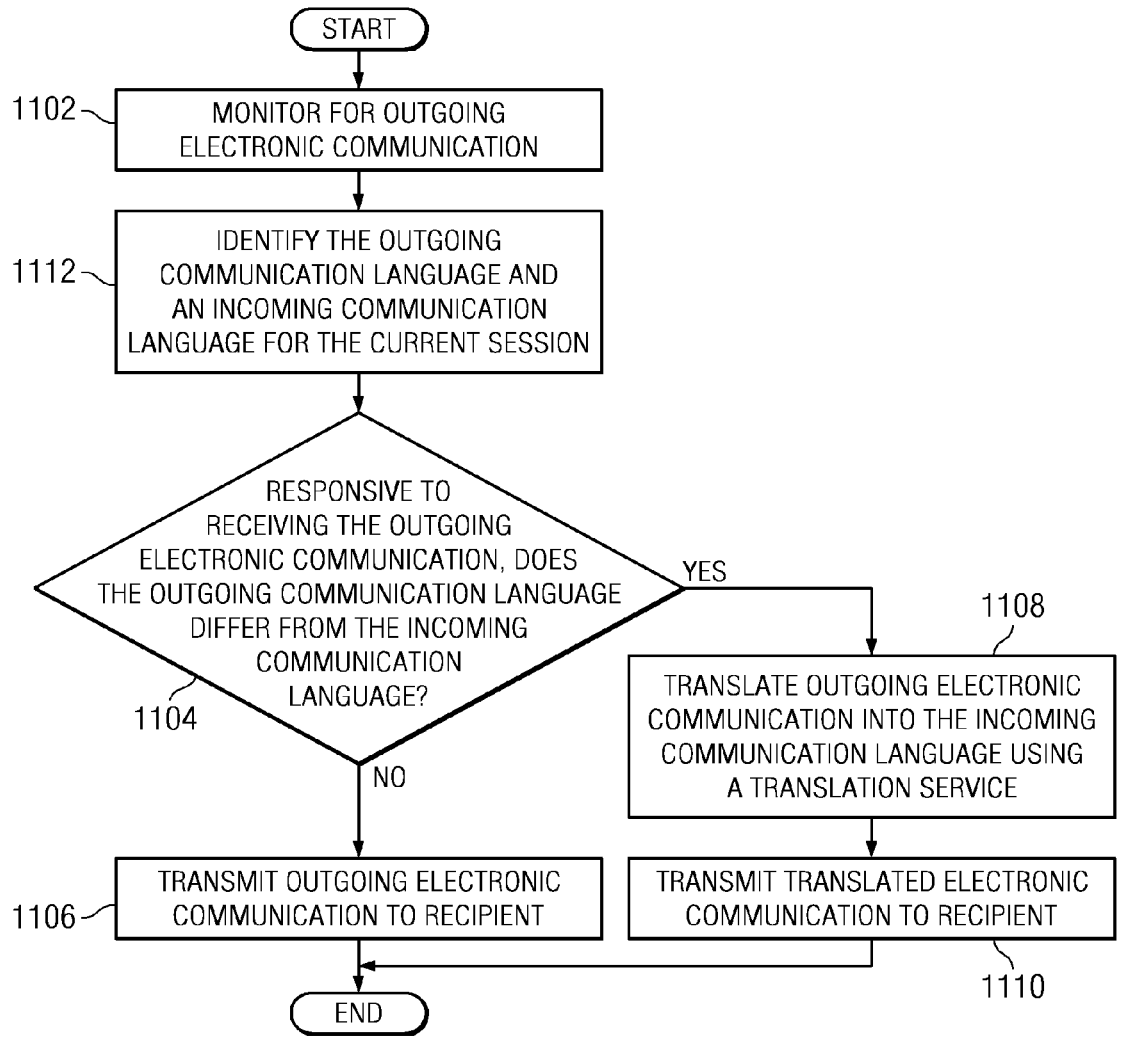
FIG. 11 is a flowchart of a process for translating an outgoing electronic communication in accordance with an illustrative embodiment.

FIG. 11 depicts a flowchart of a process for translating an outgoing electronic communication in accordance with an illustrative embodiment. The process may be implemented by messaging client computer 308 or 404.

The process begins with messaging client computer monitoring for an outgoing electronic communication (1102). The outgoing electronic communication may be entered as a result of a user input or an input by an automated process, such as a script.

Responsive to receiving the outgoing electronic communication, the messaging client computer determines whether the outgoing communication language differs from the incoming communication language (1104). To make the determination at 1104, messaging client computer may identify the outgoing communication language and an incoming communication language for the current session (1112). Messaging client computer may identify the outgoing communication language and the incoming communication language by processing the outgoing electronic communication and a prior incoming electronic communication, respectively, using an algorithm for language detection. An example of the algorithm is the well-known trigrams process.

If the outgoing communication language does not differ from the incoming communication language at step 1104, messaging client computer may transmit the outgoing electronic communication to the recipient via a communications server computer such as communications server computer 403 (1106). If the outgoing communication language differs from the incoming communication language at step 1104, messaging client computer translates the outgoing electronic communication into the incoming communication language using a translation service computer (1108). The messaging client computer may transmit the outgoing electronic communication, the outgoing communication language, and the incoming electronic communication language to a translation service computer. The translation service computer may be located in the same or a different physical data processing system as messaging client computer. The translation service computer may return a translated outgoing electronic communication.

Messaging client computer may then transmit the translated outgoing electronic communication (1110). The process terminates thereafter.

Figure 12:
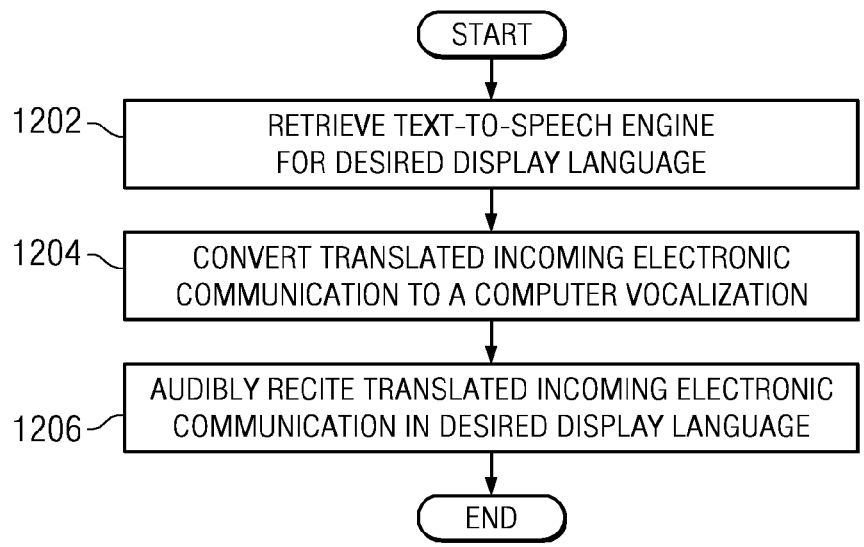
FIG. 12 is a flowchart of a process for audibly reciting an incoming electronic communication in accordance with an illustrative embodiment.

FIG. 12 is a flowchart of a process for audibly reciting a translated incoming electronic communication in accordance with an illustrative embodiment. The process may be implemented by translation manager process 309 running on messaging client computer 308 or 404, and may occur between steps 1012 and 1014, or between steps 1016 and 1018.

The process begins by retrieving the text-to-speech engine for the desired display language (1202). The text-to-speech engine may synthesize a textual message into an audible message, for example, a computer-generated voice reciting the content of a textual translated incoming electronic communication. Due to differing rules of pronunciation between languages, a text-to-speech engine may inaccurately reproduce the translated incoming electronic communication audibly if the text-to-speech engine is not programmed for the desired display language. The messaging client computer may retrieve the text-to-speech engine programmed for the desired display language from, for example, a translation service computer, such as translation service computer 320.

Once the correct text-to-speech engine is stored on the messaging client computer, the messaging client computer converts the translated incoming electronic communication to a computer vocalization (1204). The messaging client computer may convert the translated incoming electronic communication by processing the text content of the incoming electronic communication with the text-to-speech engine. Finally, the messaging client computer audibly recites the translated incoming electronic communication in the desired display language (1206). Messaging client computer may audibly recite the translated electronic communication using an audio unit, such as audio unit 222. The process terminates thereafter.

Figure 13:
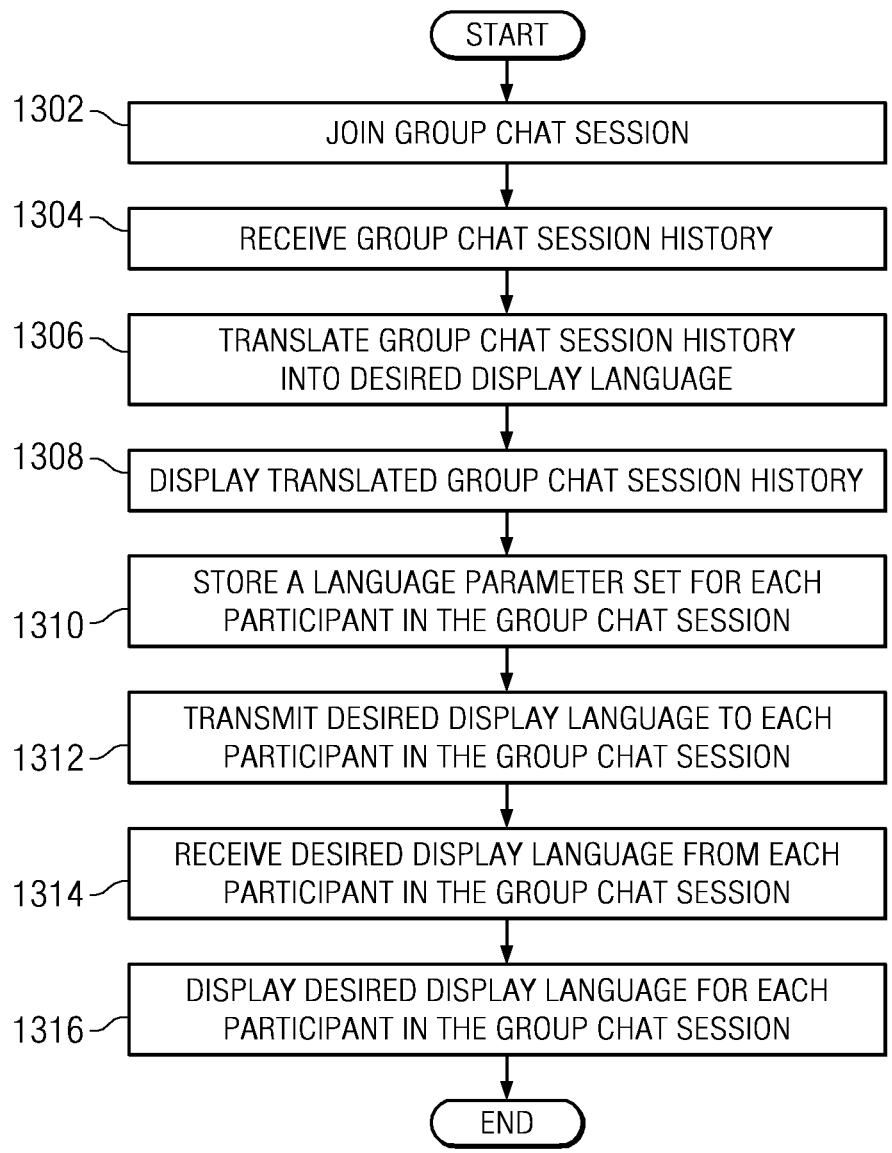
FIG. 13 is a flowchart for joining a group chat session in accordance with an illustrative embodiment.

Turning now to FIG. 13, a flowchart for joining a group chat session in accordance with an illustrative embodiment is depicted. The process may be implemented on translation manager process 309 running on messaging client computer 308 or 404.

The process begins when the messaging client computer joins a group chat session (1302). Joining a group chat session may comprise creating a session on the messaging client computer, such as Y6-06 and requesting the group chat server computer, such as group chat server computer Y6-03, add the messaging client computer to the list of participants in the group chat session. The messaging client computer then receives the group chat session history 1304. The group chat server computer may send the group chat session history. Alternatively, another participant computer in the group chat session may send the group chat session history.

The messaging client computer then translates the group chat session history into the desired display language (1306). Messaging client computer may analyze group chat session history and determine one or more group chat session history languages. If group chat session history languages match history desired display language, the translation manager process may cause the messaging client computer to display group chat session history 714. The history desired display language may be a setting set by user input or automatically identified based on the default language settings of the messaging client computer or the translation manager process.

If the group chat session history languages differ from the history desired display language, the translation manager process may cause the messaging client computer to transmit the entries in group chat session history and the group chat session history languages to a translation service computer. The translation service computer may translate group chat session history into the history display language and transmit the translated group session history to the messaging client computer. The translation manager process may then cause the messaging client computer to display the translated group chat session history (1308).

Next, the messaging client computer stores a language parameter set for each participant in the group chat session (1310). A language parameter set for each participant may comprise an incoming communication language and a desired display language. The messaging client computer then transmits a desired display language to each participant in the group chat session (1312). The transmission may be relayed to each participant by the group chat communication server. Likewise, the messaging client computer may then receive a desired display language from each participant in the group chat session (1314). Finally, the messaging client computer may display the desired display language received from each participant in the group chat session (1316). The display of the desired display language of each participant in the group chat session may aid multilingual users in minimizing the number of machine translations required in a group chat session by encouraging the multilingual users to communicate in as few different languages as possible. The process then terminates.

The illustrative embodiments provide the capability for users of an electronic communication system, such as an instant messaging system, to communicate with users that speak foreign languages without the time and effort required by manually submitting every incoming and outgoing message to a Web-based translation service. The user of a messaging system as provided in the illustrative embodiments may set a desired display language and an incoming communication language for each session. The incoming communications language may be determined automatically. In this way, the user may conduct multiple independent and simultaneous sessions. The user may be receiving and sending communications in many different languages in each of the independent and simultaneous sessions. For example, the user may be receiving Chinese textual messages that display in English in one session, while receiving French textual messages that display in Spanish in another session. In illustrative embodiments, the user may also change the desired display language and incoming communication language at any time, such as mid-session.

The illustrative embodiments also provide the capability for users to communicate in group chat sessions in which each participant in the group chat session may speak a different language, but the user may seamlessly send and receive the translated communications in the same group chat session. In illustrative embodiments, the user of the messaging client computer may set a display language and an incoming language for each participant in the group chat session.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a session of electronic communications, the method comprising:
   determining, using a processor, a language for an incoming electronic communication received from a sender computer in a first session, wherein the language for the incoming electronic communication is determined using a language modeling algorithm, wherein the first session comprises a chat in a messaging system;
   determining, by the processor, whether the language differs from a desired first display language;
   responsive to a determination that the language differs from the desired first display language, transmitting, by the processor, the incoming electronic communication to a translation service computer for translation of the incoming electronic communication into the desired first display language using a translation service to form a translated incoming electronic communication;
   receiving, by the processor, the translated incoming electronic communication from the translation service computer;
   displaying, by the processor, the translated incoming electronic communication in the first session on a display device in the first display language;
   wherein the first session and a second session occur simultaneously in the first display language and a second display language respectively on the display device for a multilingual user.

2. The method of claim 1, wherein the language is an incoming language and wherein the determination is a first determination, and further comprising:
   monitoring, by the processor, for a user input generated at a user input device, wherein the user input comprises an outgoing electronic communication;
   responsive to receiving the user input, determining, by the processor, whether an outgoing language of the outgoing message differs from the incoming language, wherein the outgoing language for the outgoing electronic communication is determined using the language modeling algorithm;
   responsive to a determination that the outgoing language differs from the incoming language, transmitting, by the processor, the outgoing electronic communication to a translation service computer for translation of the outgoing electronic communication into the incoming language using the translation service to form a translated outgoing electronic communication;
   receiving, by the processor, the translated outgoing electronic communication from the translation service computer; and
   transmitting, by the processor, the translated outgoing electronic communication to a recipient computer in the session.

3. The method of claim 2 further comprising:
   retrieving, by the processor, a spell check dictionary from the translation service computer based on the user input language; and
   performing, by the processor, a spell check on the user input using the spell check dictionary.

4. The method of claim 2, wherein the session is a video conference session and the incoming electronic communication is a textual transcription of the video conference session.

5. The method of claim 1, wherein the incoming electronic communication is an instant message and the language is identified using the language modeling algorithm.

6. The method of claim 1, wherein the session is a first session, wherein the language is a first language, wherein the desired display language is a first desired display language, and further comprising:
   associating, by the processor, the first session with the first language and the first desired display language;
   initiating, by the processor, the second session of electronic communications prior to a termination of the first session; and
   associating, by the processor, the second session with a second language and a second desired display language.

7. The method of claim 6, wherein the translated incoming electronic communication is a first translated incoming electronic communication, and further comprising:
  associating, by the processor, the first translated incoming electronic communication with the first session;
  associating, by the processor, a second translated incoming electronic communication with the second session;
  retrieving, by the processor, a first text-to-speech engine from the translation service computer corresponding to the first desired display language;
  retrieving, by the processor, a second text-to-speech engine from the translation service computer corresponding to the second desired display language;
  converting, by the processor, the first translated incoming electronic communication to a first computer vocalization using the first text-to-speech engine;
  audibly reciting, by the processor, the first translated incoming electronic communication in the first desired display language;
  converting, by the processor, the second translated incoming electronic communication to a second computer vocalization using the second text-to-speech engine; and
  audibly reciting, by the processor, the second translated incoming electronic communication in the second desired display language.

8. The method of claim 1, wherein the session is a group chat session, and further comprising:
  storing, by the processor, a language parameter set for each participant participating in the group chat session, wherein the language parameter set comprises the language and the desired display language.

9. The method of claim 8, wherein the desired display language is a first desired display language, and further comprising:
  transmitting, by the processor, the first desired display language to the each participant in the group chat session;
  receiving, by the processor, a second desired display language from the each participant in the group chat session; and
  displaying, by the processor, the second desired display language for the each participant in the group chat session.

10. The method of claim 9, wherein the determination is a first determination, and further comprising:
  receiving, by the processor, a group chat session history of the electronic communications originally transmitted prior to a messaging client computer entering the group chat session;
  responsive to a second determination that a group chat session history language differs from a history desired display language, translating, by the processor, the group chat session history into the history desired display language using the translation service to form a translated group chat session history; and
  displaying, by the processor, the translated group chat session history on the display device.

11. The method of claim 8, wherein the incoming electronic communication is a text-based file.

12. The method of claim 1, wherein the incoming electronic communication is a text-based file.

13. The method of claim 1, wherein the messaging system is an instant messaging system, and wherein the first session further comprises a semi-permanent information exchange between at least two users.

14. The method of claim 1, further comprising:
  determining whether a number of prior electronic communications have been sent from the sender computer;
  responsive to a determination that the number of prior electronic communications have been sent from the sender computer, processing the incoming electronic communication in the first session with the sender computer; and
  responsive to an absence of a determination that the number of prior electronic communications have been sent from the sender computer, initiating the first session with the sender computer.

15. The method of claim 1, wherein the step of determining, using the processor, the language for the incoming electronic communication received from the sender computer in the session comprises:
  processing a content of the incoming electronic communication using trigram language modeling.

16. A computer program product comprising:
  a non-transitory computer usable medium including computer usable program code for managing a session of electronic communications, the computer program product including instructions adapted to cause a computer to perform steps comprising:
  determining a language for an incoming electronic communication received from a sender computer in a first session, wherein the language for the incoming electronic communication is determined using a language modeling algorithm, wherein the first session comprises a chat in a messaging system;
  determining whether the language differs from a desired first display language;
  responsive to a determination that the language differs from the desired display language, transmitting, by the processor, the incoming electronic communication to a translation service computer for translation of the incoming electronic communication into the desired first display language using a translation service to form a translated incoming electronic communication;
  receiving, by the processor, the translated incoming electronic communication from the translation service computer;
  displaying the translated incoming electronic communication in the first session on a display device in a first display language;
  wherein the first session and a second session occur simultaneously in the first display language and a second display language respectively on the display device for a multilingual user.

17. The computer program product of claim 16, wherein the instructions are adapted to cause the computer to further perform steps comprising:
  monitoring for a user input generated at a user input device, wherein the user input comprises an outgoing electronic communication;
  responsive to receiving the user input, determining whether an outgoing language of the outgoing message differs from an incoming language, wherein the outgoing language for the outgoing electronic communication is determined using the language modeling algorithm;
  responsive to a determination that the outgoing language differs from the incoming language, transmitting, by the processor, the outgoing electronic communication to a translation service computer for translation of the outgoing electronic communication into the incoming language using the translation service to form a translated outgoing electronic communication;

receiving, by the processor, the translated outgoing electronic communication from the translation service computer; and transmitting the translated outgoing electronic communication to a recipient computer in the session.

18. The computer program product of claim 17, wherein the instructions are adapted to cause the computer to further perform steps comprising:

retrieving a spell check dictionary from the translation service computer based on the user input language; and performing a spell check on the user input using the spell check dictionary.

19. The computer program product of claim 17, wherein the session is a video conference session and the incoming electronic communication is a textual transcription of the video conference session.

20. An apparatus comprising:

a bus system;

a storage device connected to the bus system, wherein the storage device includes program code; and a processor unit connected to the bus system, wherein the processing unit executes the program code to determine a language for an incoming electronic communication received from a sender computer in first session, wherein the language for the incoming electronic communication is determined using a language modeling algorithm, wherein the first session is a chat in a messaging system, determine whether the language differs from a desired first display language, transmit the incoming electronic communication to a translation service computer for translation of the incoming electronic communication into the desired first display language using a translation service to form a translated incoming electronic communication receive the translated incoming electronic communication from the translation service computer responsive to a determination that the language differs from the desired first display language, and display the translated incoming electronic communication in the first session on a display device in the first display language, wherein the first session and a second session occur simultaneously in the first display language and a second display language respectively on the display device for a multilingual user.

\* \* \* \* \*